Figure 3:
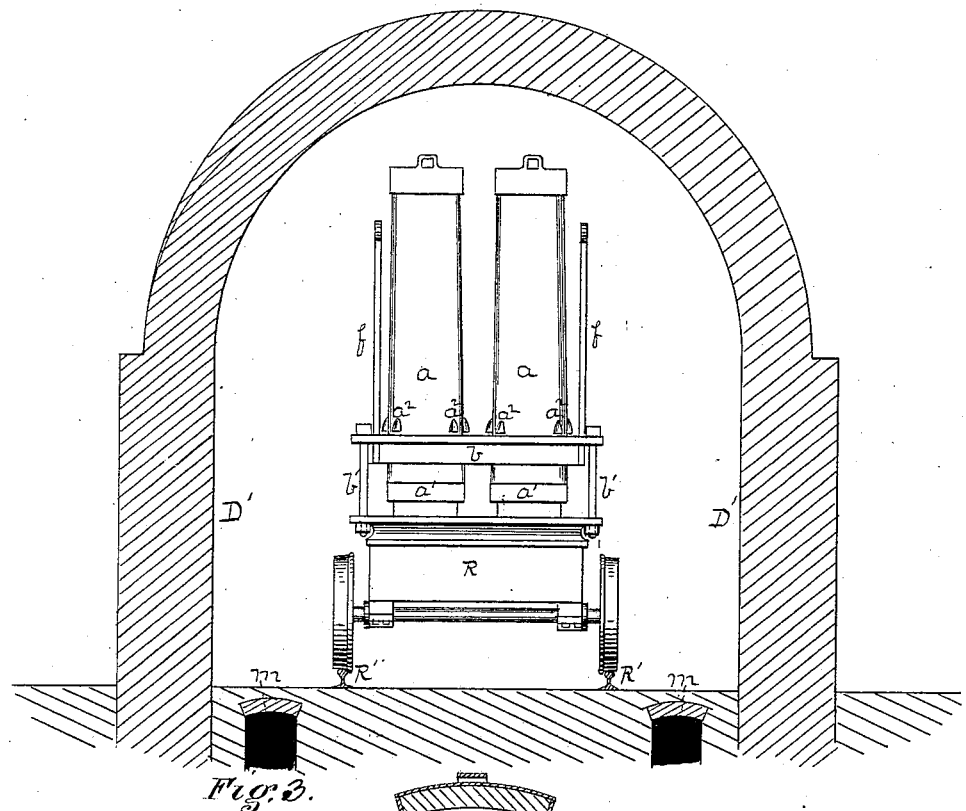

(No Model.)
W. HAINSWORTH.
APPARATUS FOR HANDLING AND HEATING CAST STEEL.
No. 266,468. Patented Oct. 24, 1882.
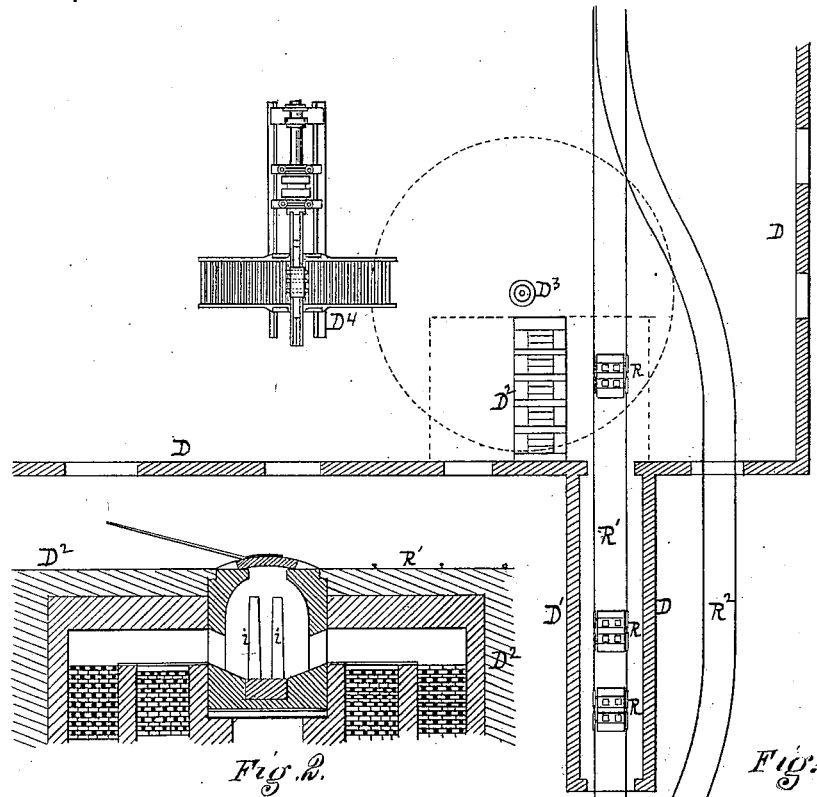
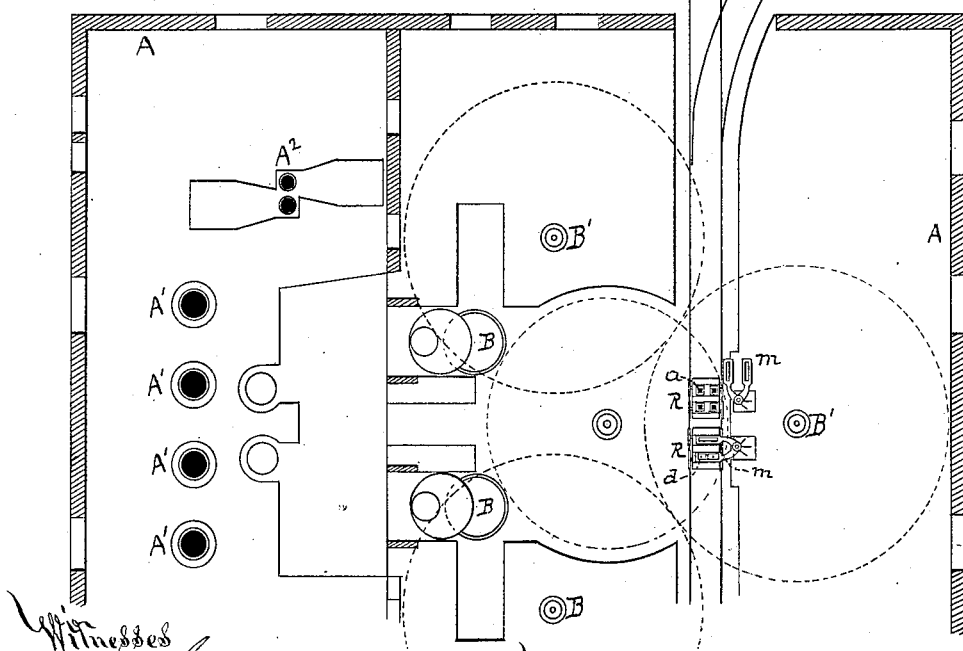

(No Model.) 2 Sheets—Sheet 2.

W. HAINSWORTH.
APPARATUS FOR HANDLING AND HEATING CAST STEEL.

No. 266,468. Patented Oct. 24, 1882.

Witnesses:
Inventor William Hainsworth
By Attorney George H. Christy

UNITED STATES PATENT OFFICE.

WILLIAM HAINSWORTH, OF PITTSBURG, PENNSYLVANIA.

APPARATUS FOR HANDLING AND HEATING CAST-STEEL.

SPECIFICATION forming part of Letters Patent No. 266,468, dated October 24, 1882.

Application filed June 22, 1882. (No model.)

*To all whom it may concern:*

Be it known that I, WILLIAM HAINSWORTH, of Pittsburg, county of Allegheny, State of Pennsylvania, have invented or discovered a new and useful Improvement in Apparatus for Handling and Heating Cast-Steel; and I do hereby declare the following to be a full, clear, concise, and exact description thereof, reference being had to the accompanying drawings, making a part of this specification, in which—like letters indicating like parts—

Figure 1, Sheet 1, is a ground plan, partly in outline, of a Bessemer plant illustrative in part of some features of my present invention. Fig. 2 is a cross-section to a slightly-enlarged scale through the upper part of the ingot-heating furnace, the same being shown to a larger scale and more in detail in Fig. 4 of Sheet 2; and Fig. 3, Sheet 2, is a cross-section to an enlarged scale through the oven $D'$ of Fig. 1, wherein the ingot, still on the car and preferably in its mold, is run, for the purpose of preventing loss of heat, between the operations of casting and rolling.

My present invention relates more especially to certain improvements in a Bessemer plant and apparatus, by which the operations connected with the handling of the metal in the casting operation are rendered much easier, more expeditious, and safer, and the ordinary percentage of waste is greatly lessened, and also by which the ingots may be submitted to the blooming operation without such loss of heat as to require such reheating as has heretofore been usual, and substantially at the same heat at which they are cast.

A, Fig. 1, represents a Bessemer house or shed in a ground-plan view, wherein the usual operations of melting and converting are carried on in any desired way, and by means of cupolas $A'$, spiegel-furnaces $A^2$, and converters B, with the aid of hydraulic or other suitable cranes located, say, at $B'$. Heretofore it has been the most common practice to arrange the ingot-molds in a central pit depressed somewhat below the ground-level, and after the casting of the ingots therein to strip off the molds and hoist the ingots by means of a crane. The ingots were then loaded on a car and run off to the blooming-mill. Before they get to this point they are practically cold and have to be reheated, which operation, with large ingots, takes much time, labor, and expense. Heating them through and through and uniformly on all sides is slow and laborious.

In a patent granted to me February 22, 1881, No. 238,110, I made provision for mounting the ingot-molds on a car, and while so mounted for casting the ingots therein, so as to get rid of the danger connected with casting them in a pit. In my present plant I cast the ingots in molds mounted on a car, but improve materially the construction of the apparatus, as presently to be explained.

D represents a blooming mill, house, or shed in a ground-plan view, and it should be in as close proximity to the Bessemer house A as practicable. The two are connected by a track, $R'$, and siding $R^2$. The track enters the Bessemer house at such point that the cars R may be brought to the proper place for the work to be conveniently done, as hereinafter described. The track $R'$ passes into and through an oven, $D'$, which is to be closed by iron doors, and so constructed and supplied with heating apparatus—say by flues $m$, Fig. 3, and suitable openings therefrom—that a comparatively high temperature may be maintained therein.

Figure 4:
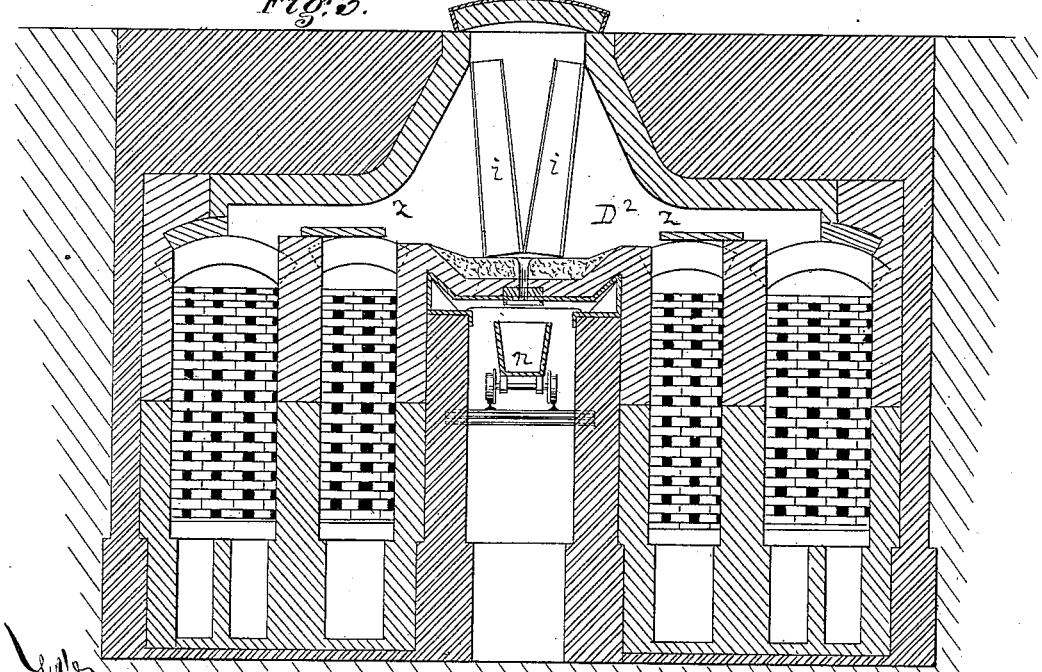

In the blooming-mill, at any convenient point—say beside or near the track—I build a heating-furnace, $D^2$, with Siemens or other suitable heating apparatus, Figs. 2, 4. A crane may be set up, say, at $D^3$, and a blooming-train, say, at $D^4$.

Turning now to the casting operation, the car R is made of suitable size to hold by preference two or more molds, $a$, Fig. 3, each of which, when mounted in place, is closed at its lower end by the stool $a'$, on which it rests. The lower ends of the molds also pass through holes of size to correspond in a heavy cast-iron frame, $b$, and the latter may be secured in place, if need be, by clamps or bolts and nuts $b'$.

Stirrups $f$ are attached to the frame, and are of such construction that when connected with a crane the frame $b$ may be lifted off the car, and the edges of the holes around the molds engaging shoulders on lugs $a^2$ on the molds, the latter will also be lifted, and so stripped clear of the ingots cast therein.

The work of casting may be done in any suitable way, but preferably by the use of appliances such as are described in an application for patent already allowed. The ingots, as soon as cast, are covered at the top, and with the molds still on them, in order to retain their heat or prevent loss of heat by rapid radiation, are run directly into the oven D' and kept there under a high temperature. As a matter of fact the molds, after being used once or twice, will become very hot, so that so long as they remain on the ingots the latter will lose heat by radiation but slowly.

Now, where it is practicable to do so, I propose to run the cars, with the molds and ingots thereon, directly to the blooming-mill, and then strip the molds from the ingots and hoist the latter directly onto the feed-table of the blooming-rolls; but as delays must sometimes occur, (and perhaps may be the rule rather than the exception,) such that the ingots are liable to be cooled below the desired blooming heat, I provide, as above stated, for running them into the hot oven D', so heated up that loss of heat by radiation will go on but slowly, if at all. As soon as the work previously in progress is sufficiently out of the way a car is run out of the oven, up alongside the heating-furnace $D^2$, where the molds are stripped off, and the ingots, still very hot, are charged into the furnace through the top—the lid being temporarily raised for the purpose—and set or stood upon end, as at $i$, Figs. 2 and 4, in suitable position to be acted on all around on all sides by the heat of the furnace entering by side flues, $z$ $z$.

If the operations thus far described are conducted properly and with speed, the ingots will still be at a working heat when charged into the furnace, except, perhaps, a comparatively thin outer shell or crust, and this will quickly be raised again to the desired temperature. In this way I avoid the very serious matter of reheating the ingot all through, and save correspondingly in time, labor, and expense. The ingots, as fast as their heat is thus restored, are hoisted out by the crane $D^3$ and transferred to the blooming-rolls. The molds, as soon as stripped off, may be set on another car made in readiness for the purpose, and the latter be run at once by siding $R^2$ back to the Bessemer mill for another cast. Thus the work may go on continuously, and with great speed and saving of time, labor, and expense.

Another important element of utility is attained by the operation thus described. With large ingots, when stripped and allowed to cool rapidly, the chilling of the outer crust sometimes takes place before the interior or core is fully solidified. Chilling is attended with shrinkage, and the shrinking of the outer crust onto the unsolidified core is apt to result in injury of some kind—sometimes in the bulging out of one end and sometimes apparently in a result which I can best describe as a partial exudation of the molten steel inside through or into the pores of the already solidified exterior crust. It also seems probable that the cracks or flaws frequently found in the steel ingots are caused by the rapid cooling and shrinking referred to, and these evils seem to be aggravated oftentimes in their effects by the fact that the ingots have heretofore usually been laid on their sides as soon as they are lifted out of the pit. Apparently it sometimes happens that this is done before the central part of the ingot has become fully solidified, and in such case the irregularities of action above described are correspondingly intensified. By the operation described I overcome all these evils wholly or in great part; and, still further, by keeping the ingots standing on end or in a vertical position until they reach the table of the blooming-train I avoid the like difficulties which are liable to arise from the unequal, ununiform cooling of their sides when lying down, or ununiform reheating of their sides when placed horizontally in the furnace, as has heretofore been the case. In other words, I not only reduce to an inappreciable element the strains liable to arise between casting and rolling, but also render uniform in degree and direction such strains as do arise, and by the operation and means thus described I lessen very largely the loss or waste of metal by scaling.

With the old mode of handling ingots commonly practiced nearly or quite a sixteenth of an inch of the exterior was lost as scale, which in a large mill becomes a source of considerable loss. In my invention the ingot is almost wholly protected as against the formation of scale until it reaches the blooming-table. While being reheated the furnace does not have to be opened at short intervals for the purpose of turning the ingot over, and hence it is protected as against currents of cold air, which sometimes seem to produce cracks as well as scale. The car $n$ of Fig. 4 is for the reception of refuse slag, which may be tapped out through the bottom of the furnace-chamber.

While I prefer, as described, to keep the molds on the ingots until they are run into the blooming-mill, they may be lifted off just before the car is run into the oven, especially if the latter is kept at a comparatively high temperature; and for the latter purpose a special furnace may be employed; or the waste heat of some of the usual mill-furnaces may be introduced through the flues $m$ and suitable openings therefrom.

The cars are preferably worked by a traction rope or chain, or in other equivalent way.

I claim herein as my invention—

1. An apparatus for the handling of ingots in a vertical position during their passage or transfer from the casting pit or place to the blooming-train, having in combination a car or truck on which the ingot-molds are placed, and adapted to carry the molds and ingots therein thence to the blooming-mill, a track connecting the two, an intermediate oven of capacity to receive both the car and its load, and a reheating-furnace arranged in convenient proximity to the track at the blooming-mill, and adapted in form to receive the ingots in a vertical position while being reheated, and means for transferring the ingots from the furnace to the blooming-train, substantially as and for the purposes set forth.

2. The frame $b$, provided with lifting-stirrups $f$, in combination with molds $a$, provided with lugs $a^2$, substantially as set forth.

In testimony whereof I have hereunto set my hand.

WILLIAM HAINSWORTH.

Witnesses:
 GEORGE H. CHRISTY,
 R. H. WHITTLESEY.